(12) United States Patent
Iwashita et al.

(10) Patent No.: US 10,507,717 B2
(45) Date of Patent: Dec. 17, 2019

(54) GEAR OPERATING MECHANISM IN TRANSMISSION

(71) Applicant: Honda Motor Co., Ltd., Tokyo (JP)

(72) Inventors: Hideaki Iwashita, Saitama (JP); Hiromichi Konishi, Saitama (JP); Kazuhiko Kitano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 15/700,180

(22) Filed: Sep. 11, 2017

(65) Prior Publication Data

US 2018/0072148 A1   Mar. 15, 2018

(30) Foreign Application Priority Data

Sep. 13, 2016  (JP) ................................ 2016-178894

(51) Int. Cl.
*F16H 59/00*  (2006.01)
*F16H 61/00*  (2006.01)
(Continued)

(52) U.S. Cl.
CPC ............... *B60K 6/36* (2013.01); *B60K 6/387* (2013.01); *B60K 6/48* (2013.01); *B60W 10/023* (2013.01);
(Continued)

(58) Field of Classification Search
CPC ........................... B60K 6/36; F16H 2063/202
(Continued)

(56) References Cited

U.S. PATENT DOCUMENTS

| 9,453,575 B2 * | 9/2016 | Eto ........................ F16H 61/16 |
| 2004/0112158 A1 * | 6/2004 | Norum ..................... B60K 6/24 74/335 |

(Continued)

FOREIGN PATENT DOCUMENTS

| CN | 104747709 | 7/2015 |
| JP | 2015-127571 | 7/2015 |

(Continued)

OTHER PUBLICATIONS

"Office Action of Japan Counterpart Application," dated May 8, 2018, with English translation thereof, p. 1-p. 7.
(Continued)

*Primary Examiner* — Jake Cook
(74) *Attorney, Agent, or Firm* — JCIPRNET

(57) ABSTRACT

A gear operating mechanism comprises: a power source; an operation shaft driven using the power source and rotatably supported in a rotational direction and an axial direction; members to be operated corresponding to fork parts; an operation engagement piece attached to the operation shaft and configured to move each member to be operated between a reference position and an engagement position; a release engagement pieces attached to the operation shaft and configured to return the members to be operated from the engagement position to the reference position; and a control unit configured to control an operation of the operation shaft is provided, wherein the control unit has a first release mode using the release engagement pieces and a second release mode using the operation engagement piece when the member to be operated is returned from the engagement position to the reference position.

18 Claims, 10 Drawing Sheets

(51) Int. Cl.
    *F16H 63/00*     (2006.01)
    *B60K 6/36*     (2007.10)
    *B60K 6/387*     (2007.10)
    *B60K 6/48*     (2007.10)
    *B60W 10/02*     (2006.01)
    *B60W 10/08*     (2006.01)
    *B60W 20/30*     (2016.01)
    *F16H 3/093*     (2006.01)

(52) U.S. Cl.
    CPC ............ *B60W 10/08* (2013.01); *B60W 20/30* (2013.01); *F16H 3/093* (2013.01); *F16H 2200/0056* (2013.01); *F16H 2200/0082* (2013.01)

(58) Field of Classification Search
    USPC ............................................ 74/473.1, 473.36
    See application file for complete search history.

(56) References Cited

U.S. PATENT DOCUMENTS

2012/0204669 A1\*   8/2012   Birk ...................... F16H 63/206
                                                                  74/473.36
2017/0307079 A1\*   10/2017   Masui ..................... F16H 61/34

FOREIGN PATENT DOCUMENTS

| JP | 2015-154519 | 8/2015 |
| JP | 2016-084898 | 5/2016 |
| JP | WO2014125722 | 2/2017 |
| WO | 2014125722 | 8/2014 |
| WO | 2016067656 | 5/2016 |

OTHER PUBLICATIONS

"Office Action of China Counterpart Application," dated Jan. 28, 2019, with English translation thereof, p. 1-p. 12.

\* cited by examiner

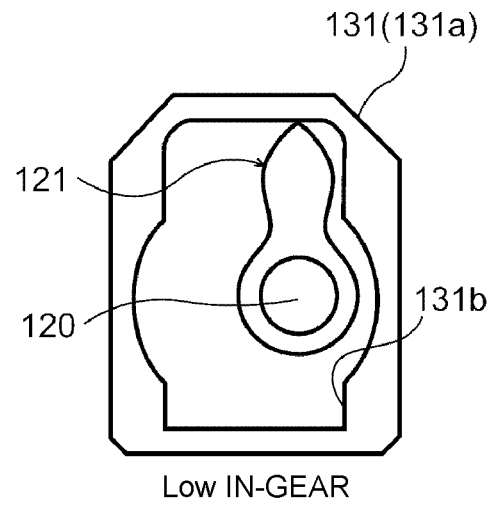
FIG. 6A  Low IN-GEAR
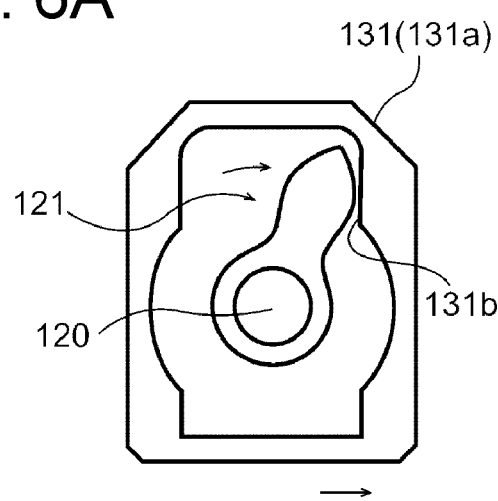
FIG. 6B
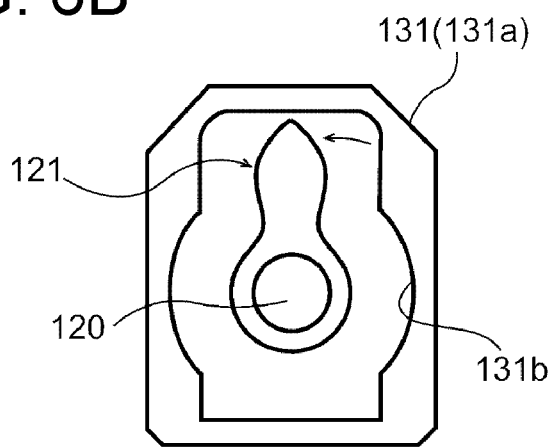
FIG. 6C  Low OFF-GEAR

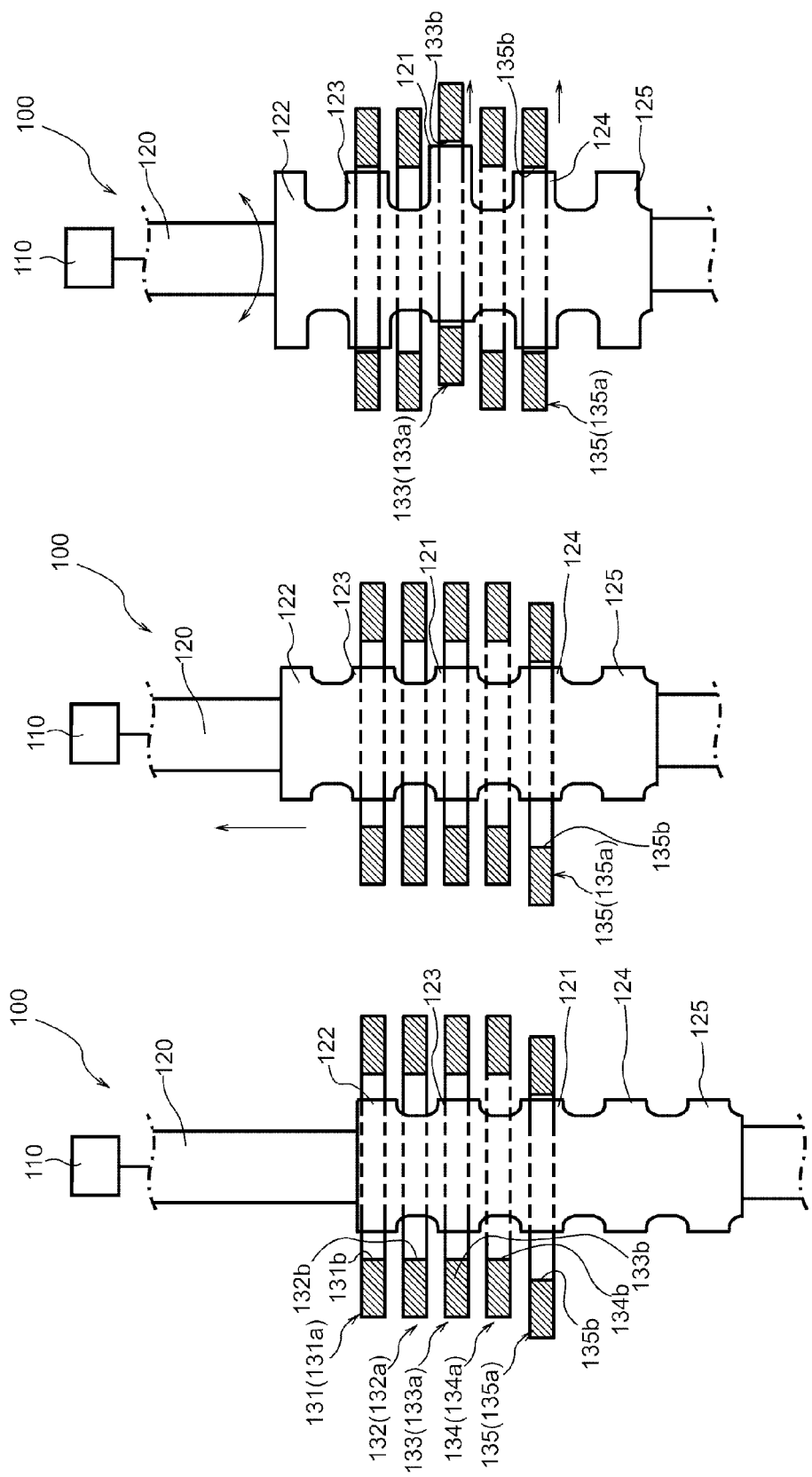

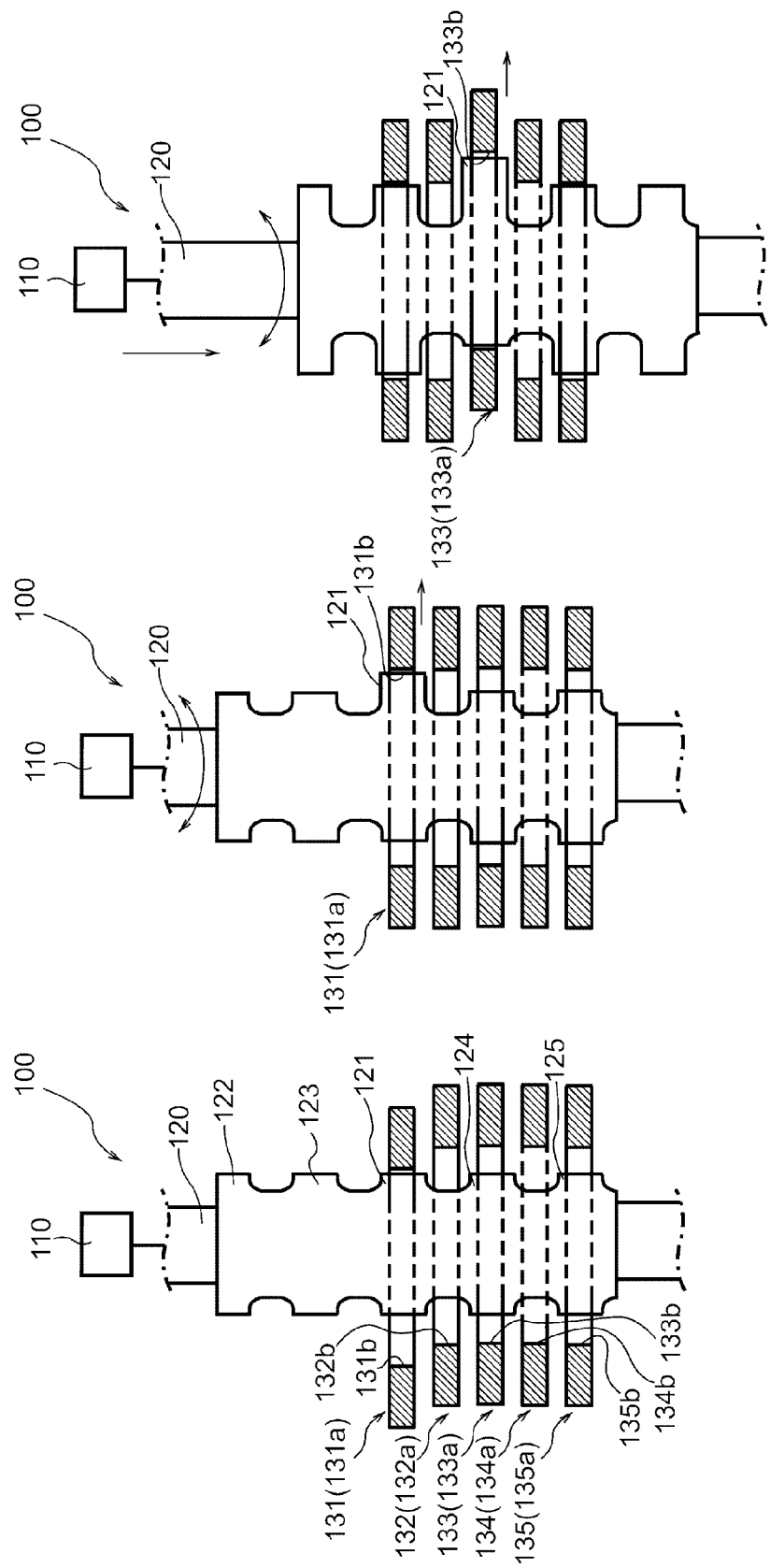

GEAR OPERATING MECHANISM IN TRANSMISSION

CROSS-REFERENCE TO RELATED APPLICATION

This application claims the priority benefit of Japan Application no. 2016-178894, filed on Sep. 13, 2016. The entirety of the above-mentioned patent application is hereby incorporated by reference herein and made a part of this specification.

BACKGROUND OF THE INVENTION

Field of the Invention

The present invention relates to a gear operating mechanism in a transmission which includes sleeves configured to synchronize rotations of a rotating shaft and gear and shift forks configured to cause the sleeves to slide.

Description of Related Art

In the related art, for example, various transmissions in addition to a manual transmission (MT) have a plurality of stages of shift gear trains, such as an automatic manual transmission (AMT) and a dual clutch transmission, and a shift stage is switched using an operation of a shift lever or driving of an actuator mechanism of a driver, and thus a gear of each stage is meshed (for example, refer to Patent Document 1). Thus, the transmission is configured such that power of an engine is converted and output in accordance with travel conditions so that wheels are driven. Such a transmission includes a synchronous device (a synchromesh mechanism) as a mechanism in which a synchronous load is reduced at the time of shifting involving switching of an engagement state of the gear and a shifting operation is rapidly and easily performed.

The above-described synchronous device includes a hub fixedly provided in a rotating shaft, a gear relatively rotatably disposed in the rotating shaft, synchronous sleeves which are able to slide in an axial direction of the rotating shaft and synchronize rotations of the rotating shaft and the gear by engaging the rotating shaft with the hub and the gear, shift forks configured to cause the synchronous sleeves to slide in the axial direction thereof, and a shift fork shaft to which the shift forks are attached. Moreover, the synchronous sleeves are caused to slide using the shift forks in the axial direction thereof in accordance with movement of the shift fork shaft in the axial direction thereof so that a predetermined shift stage is set.

A gear operating mechanism configured to move the shift forks along the shaft is used to operate the shift forks. For example, in the gear operating mechanism illustrated in Patent Document 2, the shift shaft configured to slide to be able to move the shift forks in the axial direction thereof is rotatably moved by an actuator in the axial direction thereof. Moreover, a plurality of engagement pieces provided in the shift shaft and disposed in a stacked layer are moved in the axial direction so that the shift forks integrally disposed with the engagement pieces are moved in the axial direction.

In a technique disclosed in Patent Document 2, when a predetermined shift fork corresponding to a predetermined gear is attempted to be operated, a predetermined engagement piece used to operate the predetermined shift fork is moved in an in-gear direction. At the same time, another engagement piece used to operate another shift fork corresponding to another gear is moved in an off-gear direction. The engagement pieces are moved using one in-gear engagement cam attached to the shift shaft and a plurality of off-gear engagement cams. Because in-gear and off-gear operations are more reliably performed even when transmission torque in the gear is large in such a gear operating mechanism, a gear operation needs to be reliably performed.

PRIOR ART DOCUMENT

Patent Documents

[Patent Document 1] PCT International Publication NO. WO2014/125722
[Patent Document 2] Japanese Unexamined Patent Application Publication No. 2015-154519

SUMMARY OF THE INVENTION

The present invention was made in view of the above-described circumstances, and an objective thereof is to provide a gear operating mechanism configured to more reliably perform a gear operation.

In order to solve the above-described problems, a gear operating mechanism (100) in a transmission according to the present invention is a gear operating mechanism in a transmission which operates fork parts (141 to 145) configured to operate synchronous mechanisms (a 1-speed synchronous mechanism (81), a 2-6-speed synchronous mechanism (82), a 3-7-speed synchronous mechanism (83), a 4-speed synchronous mechanism (84), a 5-speed synchronous mechanism (85), and a reverse synchronous mechanism (89)) attached to rotating shafts (an inner main shaft (IMS), a secondary shaft (SS), and a reverse shaft (RVS)) included in the transmission (50) mounted in a hybrid vehicle; a power source (an actuator (110)); an operation shaft (a shift shaft (120)) driven by the power source and movably supported in a rotational direction and an axial direction; members to be operated (131 to 135) corresponding to the fork parts; an operation engagement piece (an in-gear engagement piece (121)) attached to the operation shaft and configured to move the member to be operated between the reference position and an engagement position; release engagement pieces (off-gear engagement pieces (122 to 125)) attached to the operation shaft and configured to return the member to be operated from the engagement position to the reference position; and a control unit (105) configured to control an operation of the operation shaft, wherein the control unit has: a first release mode using the release engagement pieces and a second release mode using the operation engagement piece when the member to be operated is returned from the engagement position to the reference position.

As described above, the control unit uses the first release mode using the release engagement piece as well as the second release mode using the operation engagement piece with a large amount of movement configured to be moved between the reference position and the engagement position when the member to be operated is returned from the engagement position to the reference position so that the member to be operated and the fork part integrally constituted with the member to be operated can be more reliably moved, and thus the gear can be reliably disengaged from the gear in the synchronous mechanism moved by the fork part, for example, even when transmission power between the gear and the synchronous mechanism which are fastened is large. Thus, a gear operation can be more reliably performed.

Also, in the gear operating mechanism in the transmission, the control unit may use the first release mode when transmission power between the rotating shaft and each of the synchronous mechanisms is less than a predetermined value and use the second release mode when the transmission power between the rotating shaft and each of the synchronous mechanisms is the predetermined value or more. As described above, when a magnitude of the transmission power is a predetermined value or more, the member to be operated is reliably moved using the operation engagement piece so that a release operation can be reliably performed even when the magnitude of the transmission power is the predetermined value or more.

In the gear operating mechanism in the transmission, the operation engagement piece may be formed to have a longer length than the release engagement pieces. As described above, the operation engagement piece is formed to be longer than the release engagement piece so that an operation quantity of the member to be operated is large.

In the gear operating mechanism in the transmission, the member to be operated may be able to be moved in two directions, and any member to be operated (131) among the members to be operated may be configured such that a corresponding one (81) of the synchronous mechanisms is moved when the member to be operated is moved to one side and none of the other synchronous mechanisms is moved when the member to be operated is moved to the other side. As described above, if a configuration in which none of the synchronous mechanisms is moved when the member to be operated (131) is moved to the other side is provided, none of the gears is in an in-gear state even when the member to be operated is further moved to the other side after the member to be operated is returned from an engagement position to the reference position when the member to be operated which is moved to one side and is at an engagement position is disengaged. Thus, the member to be operated can be significantly moved to the other side when an off-gear operation is performed at the time of shifting. Therefore, an off-gear operation can be reliably performed, for example, even when a large load is applied to the member to be operated.

In the gear operating mechanism in the transmission, the plurality of members to be operated may be provided, and the control unit may use the second release mode for a predetermined member to be operated (a 1-speed shift member 131) among the members to be operated and use the first release mode for a member to be operated (a 4-speed-R shift member 132, a 3-7-speed shift member 133, a 2-6-speed shift member 134, or a 5-speed-P shift member 135) other than the predetermined member to be operated. In other words, if it is known in advance that large transmission power is applied to a predetermined member to be operated among the plurality of members to be operated, control is simply set if it has been determined that the second release mode is used when an engagement release is performed on the predetermined member to be operated.

In the gear operating mechanism in the transmission, the control unit may perform an engagement release operation after the operation engagement piece (121) is put on standby at a position at which the operation engagement piece is adjacent to the predetermined member to be operated (131) when the second release mode is used. The operation engagement piece (121) is put on standby at the position at which the operation engagement piece is adjacent to the predetermined member to be operated in advance as described above so that an engagement release of the predetermined member to be operated can be rapidly performed, and thus a gear operation is reliably performed and responsiveness thereof is improved.

In the gear operating mechanism in the transmission, the control unit performs an engagement release using the first release mode using the release engagement piece (122) upon receiving a parking command so that an off-gear operation using the release engagement piece (122) and an in-gear operation of the member to be operated (135) toward the parking gear using the operation engagement piece can be performed at the same time. Thus, responsiveness of a gear operation is improved.

The gear operating mechanism in the transmission may further include: a gradient determination unit (106) configured to determine a gradient, wherein the control unit puts the operation engagement piece (121) on standby at the position at which the operation engagement piece (121) is adjacent to a corresponding member to be operated (135) of a parking gear if it is determined by the gradient determination unit that the gradient is the predetermined value or more when the hybrid vehicle is stopped. As described above, if the gradient is the predetermined value or more when the hybrid vehicle is stopped, the operation engagement piece is put on standby at the position at which the operation engagement piece is adjacent to the member to be operated corresponding to the parking gear in advance so that an in-gear operation of the member to be operated corresponding to the parking gear can be rapidly performed, and thus responsiveness of the gear is improved.

Note that the above-described reference numerals in the parentheses are reference numerals of constituent elements in embodiments which will be described below as examples of the present invention.

According to a gear operating mechanism according to the present invention, a gear operation can be more reliably performed.

BRIEF DESCRIPTION OF THE DRAWINGS

FIGS. 6A to 6C are diagrams for describing a release operation (a second release mode) of the shift member in the gear operating mechanism.

FIGS. 7A to 7C are diagrams for describing an operation of a shift shaft in a first release mode.

FIGS. 8A to 8C are diagrams for describing an operation of the shift shaft in a second release mode.

DESCRIPTION OF THE EMBODIMENTS

An embodiment of the present invention will be described in detail below with reference to the accompanying drawings. To facilitate understanding of the detailed configuration of a gear operating mechanism 100, first, a transmission 50 including the gear operating mechanism 100 will be described in brief, and then description associated with the gear operating mechanism 100 will be provided.

Figure 1:
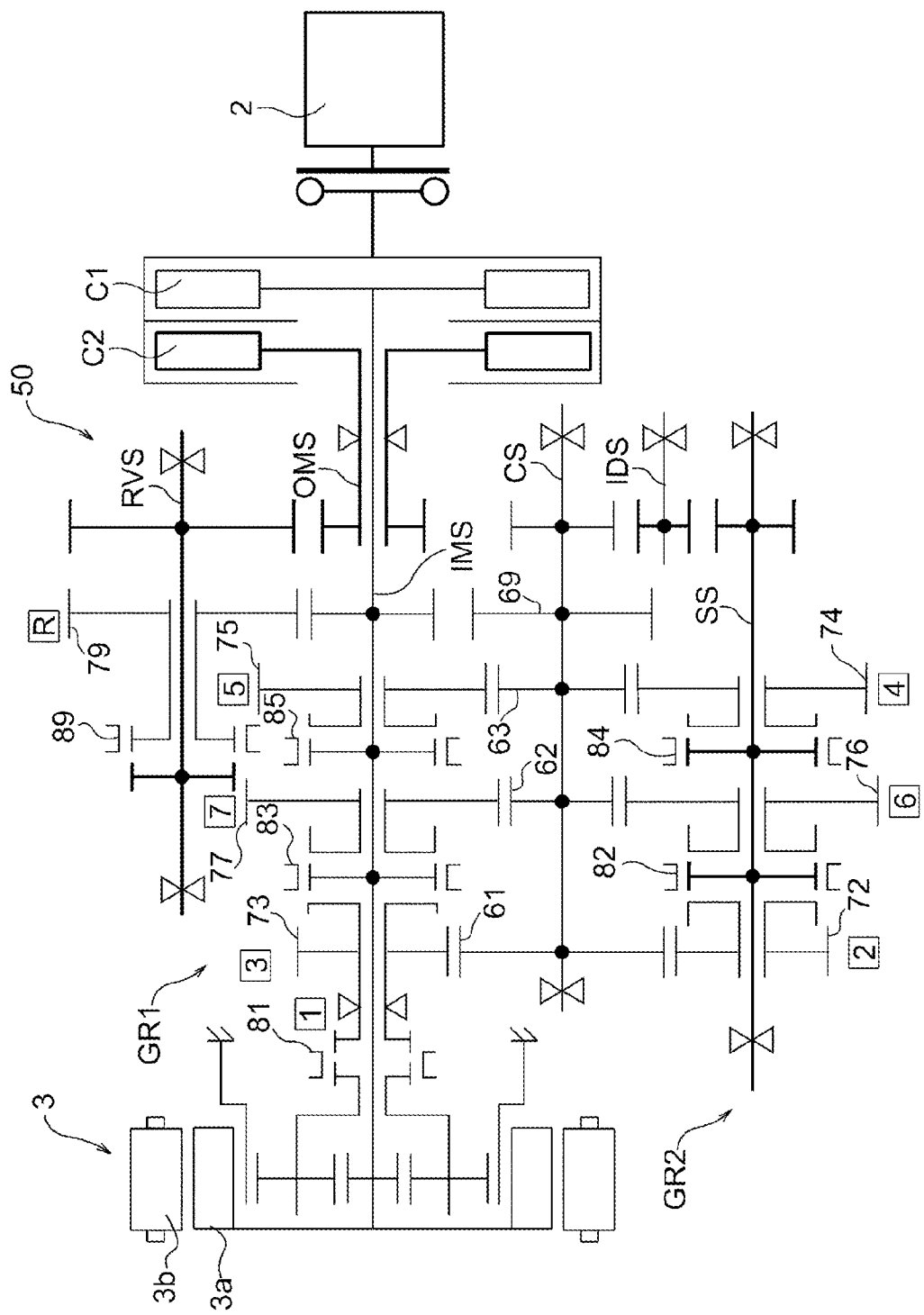
FIG. 1 is a skeleton diagram illustrating an example of a transmission.

FIG. 1 is a skeleton diagram illustrating an example of the transmission 50. The transmission 50 illustrated in FIG. 1 is a parallel shaft type transmission of a forward 7-speed and rearward 1-speed and dry type dual clutch transmission (DCT).

The transmission 50 includes an inner main shaft IMS joined to an internal combustion engine 2 such as an engine to be able to be connected and disconnected through a first clutch C1 for odd stages, a secondary shaft SS joined to the internal combustion engine 2 to be able to be connected and disconnected through a second clutch C2 for even stages, a counter shaft CS joined through a shift gear mechanism provided in the inner main shaft IMS and the secondary shaft SS and configured to generate a rotational output corresponding to a selected shift stage, and a planetary gear mechanism 5 provided on one end side of the inner main shaft IMS.

An electric motor 3 is disposed on one end of the inner main shaft IMS. In the electric motor 3, a rotor 3a serving as a rotating part is fixed to a stator 3b serving as a stationary part in the electric motor 3 to rotate integrally therewith. The transmission 50 is a transmission of a hybrid vehicle using the internal combustion engine 2 and the electric motor 3 as driving sources. The counter shaft CS is joined to a differential mechanism (not shown) and is used to drive drive wheels of the hybrid vehicle. The planetary gear mechanism 5 is disposed on one end of the inner main shaft IMS near the electric motor 3.

An outer main shaft OMS is connected to an output side of the second clutch C2, and the outer main shaft OMS is disposed concentrically with the first input shaft IMS to form an outer cylinder of the first input shaft IMS. The outer main shaft OMS is engaged with a reverse shaft RVS and the secondary shaft SS through an idle shaft IDS at all times, and a rotational output of the second clutch C2 is transferred to the reverse shaft RVS and the secondary shaft SS.

A 3-speed driving gear 73, a 7-speed driving gear 77, and a 5-speed driving gear 75 are relatively rotatably disposed concentrically with each other in the inner main shaft IMS. A 3-7-speed synchronous mechanism 83 is provided between the 3-speed driving gear 73 and the 7-speed driving gear 77 to be able to slide in an axial direction thereof, and a 5-speed synchronous mechanism 85 is provided to correspond to the 5-speed driving gear 75 and to be able to slide in the axial direction thereof. Moreover, a 1-speed synchronous mechanism 81 is provided between a carrier in the planetary gear mechanism 5 and the 3-speed driving gear 73 in the inner main shaft IMS. The 1-speed synchronous mechanism 81 is switched so that a rotational driving force of a pinion gear in the planetary gear mechanism 5 is transferred to the counter shaft CS via the carrier. A first shift mechanism GR1 used to realize shift stages for odd stages (1-, 3-, 5-, and 7-speeds) is constituted of the gears and the switching mechanism provided in association with the inner main shaft IMS.

A 2-speed driving gear 72, a 6-speed driving gear 76, and a 4-speed driving gear 74 are relatively rotatably disposed concentrically with each other in the secondary shaft SS. A 2-6-speed synchronous mechanism 82 is provided between the 2-speed driving gear 72 and the 6-speed driving gear 76 to be able to slide in the axial direction thereof, and a 4-speed synchronous mechanism 84 is provided to correspond to the 4-speed driving gear 74 and to be able to slide in the axial direction thereof. A second shift mechanism GR2 used to realize shift stages for even stages (2-, 4-, and 6-speeds) is constituted of the gears and the switching mechanism provided in association with the secondary shaft SS.

Driving gears in the first shift mechanism GR1 and the second shift mechanism GR2 are meshed with corresponding gears in a first driven gear 61, a second driven gear 62, and a third driven gear 63 which are provided in the counter shaft CS. The meshing is performed as described above so that the counter shaft CS is rotatably driven.

A reverse driving gear 79 is relatively rotatably disposed in the reverse shaft RVS concentrically therewith. A reverse synchronous mechanism 89 is provided to correspond to the reverse driving gear 79 and to be able to slide in the axial direction thereof. Furthermore, an idle gear 78 engaged with a gear in the outer main shaft OMS is fixed to the reverse shaft RVS. Thus, rotation of the second clutch C2 is transferred to the reverse shaft RVS via the outer main shaft OMS and the idle gear 78, and thus the reverse driving gear 79 rotates. The reverse driving gear 79 is meshed with a reverse driven gear 69 in the counter shaft CS.

Figure 2:
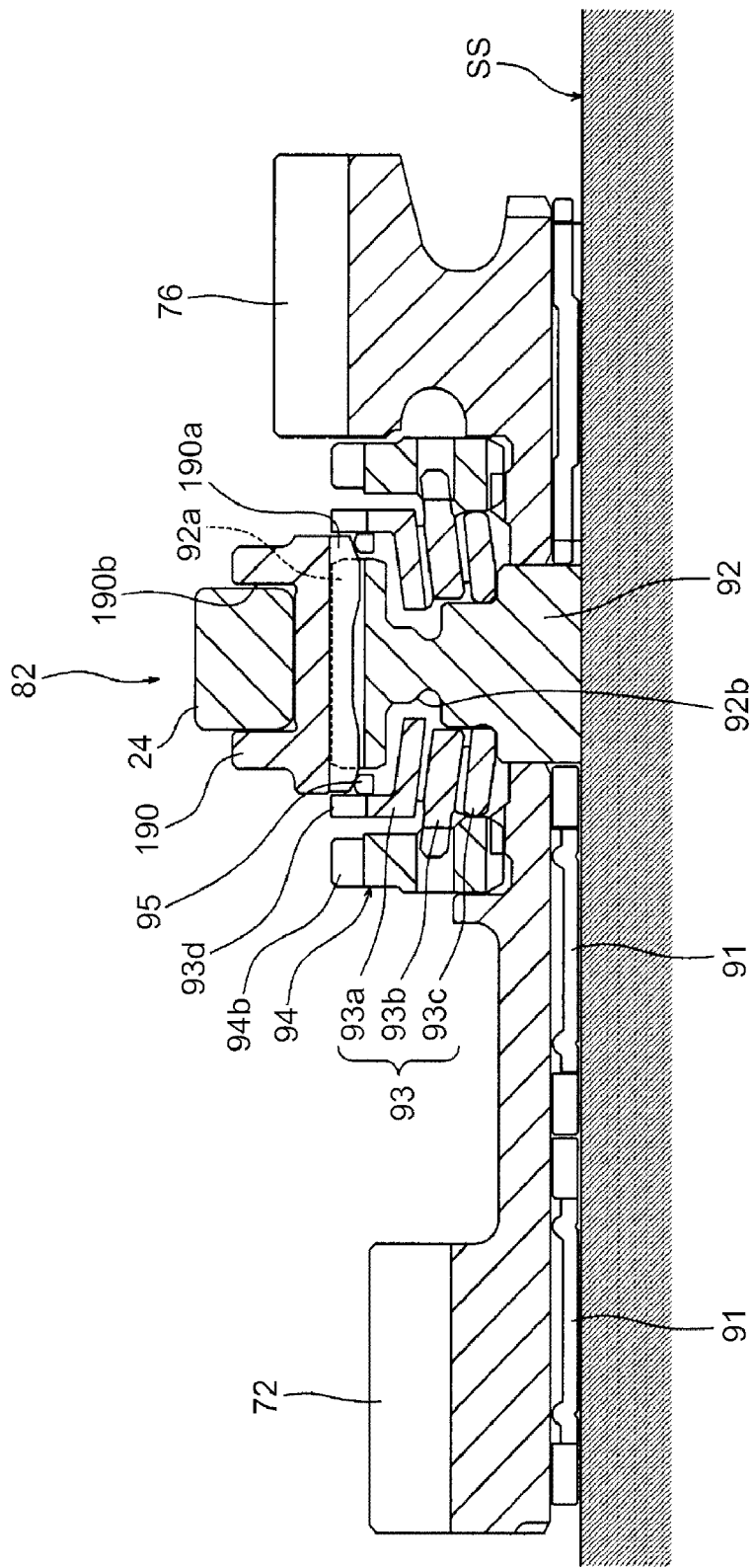
FIG. 2 is a cross-sectional view of a synchronous mechanism.

Next, a configuration of synchronous mechanisms included in the transmission 50 will be described. Note that description thereof will be provided using the 2-6-speed synchronous mechanism 82 as an example in the following description, but other synchronous mechanisms also have the same configuration. FIG. 2 is a cross-sectional view of the synchronous mechanism 82. The synchronous mechanism 82 shown in FIG. 2 is a synchronous mechanism for a 2-speed stage and a 6-speed stage included in the transmission 50 which includes a synchronous coupling device for the 2-speed driving gear 72 and a synchronous coupling device for the 6-speed driving gear 76 disposed on both sides in the axial direction thereof.

Here, since the synchronous coupling device for the 2-speed driving gear 72 and the synchronous coupling device for the 6-speed driving gear 76 are symmetric and have substantially the same configuration in the axial direction thereof, the following description will focus on a configuration and an operation of the synchronous coupling device for the 2-speed driving gear 72. Furthermore, an axial direction and a radial direction mentioned in the following description refer to an axial direction and a radial direction of the secondary shaft SS, and the right and the left mentioned therein refer to a right direction and a left direction in the axial direction of the secondary shaft SS in the state shown in FIG. 2.

The synchronous mechanism 82 is a mechanism configured to synchronously join the 2-speed driving gear 72 in the secondary shaft SS to the secondary shaft SS. The 2-speed driving gear 72 is relatively rotatably supported by an outer circumference of the secondary shaft SS with a needle bearing 91. An annular synchronous hub 92 spline-joined to the secondary shaft SS is installed at one lateral portion of the 2-speed driving gear 72 in the axial direction, and a sleeve 190 spline-joined slidably in the axial direction is installed at an outer circumference side of the synchronous hub 92. Spline teeth 92a are formed in an outer circumferential surface of the synchronous hub 92, and spline teeth 190a meshed with the spline teeth 92a in the synchronous hub 92 are formed in an inner circumferential surface of the sleeve 190. The sleeve 190 is moved to the right and the left from a neutral position shown in FIG. 2 using a fork part 24 engaged with a concave part 190b in an outer circumference thereof.

A blocking ring 93 is installed at an annular concave part 92b formed in one lateral surface (a lateral surface at the 2-speed driving gear 72 side) of the synchronous hub 92. The blocking ring 93 is constituted of an outer ring 93a disposed on an outer side thereof in the radial direction thereof, an inner ring 93b disposed on an inner side thereof in the radial direction thereof, and a synchronous cone 93c sandwiched between the outer ring 93a and the inner ring 93b in the radial direction thereof.

A dog gear 94 integrally formed with the 2-speed driving gear 72 is provided on an end in the 2-speed driving gear 72 at the blocking ring 93 side, and dog teeth 94b are formed in an outer circumference of the dog gear 94. Dog teeth 93d are formed in an outer circumference of the outer ring 93a. The dog teeth 94b and the dog teeth 93d are arranged adjacent to each other in the axial direction. An annular synchronous spring 95 is installed at an outer circumference of the blocking ring 93.

Next, a synchronous coupling operation when a gear is operated in the synchronous mechanism 82 with the above-described configuration will be described. As shown in FIG. 2, when the sleeve 190 is at a neutral position, a load does not act on the blocking ring 93. Therefore, the outer ring 93a and the inner ring 93b have no frictional force with the synchronous cone 93c, and thus the synchronous cone 93c can rotate relative to the outer ring 93a and the inner ring 93b. For this reason, the outer ring 93a and the inner ring 93b integrally rotate with the synchronous hub 92, and the synchronous cone 93c integrally rotates with the 2-speed driving gear 72. Therefore, no synchronization occurs between the sleeve 190 and the 2-speed driving gear 72.

When the sleeve 190 is moved to the left of the synchronous hub 92 in this state, the sleeve 190 and the outer ring 93a slide through the synchronous spring 95. After that, chamfers (not shown) formed on a distal end of the spline teeth 190a in the sleeve 190 come into contact with chamfers (not shown) formed on the dog teeth 93d in the outer ring 93a.

Thus, the outer ring 93a is pressed in the axial direction so that a frictional force occurs due to synchronization of the synchronous cone 93c with the outer ring 93a and the inner ring 93b. As a result, the synchronous cone 93c is integrated with the sleeve 190 due to the frictional force, and thus rotation of the 2-speed driving gear 72 engaged with the synchronous cone 93c synchronizes with rotation of the sleeve 190.

When the sleeve 190 is further moved to the left, the chamfers of the spline teeth 190a are disengaged from the chamfers of the dog teeth 93d in the outer ring 93a, and the spline teeth 190a and the dog teeth 93d are fully meshed. Moreover, when the sleeve 190 is further moved to the left, the chamfers of the spline teeth 190a are engaged with chamfers of the dog teeth 94b at the 2-speed driving gear 72 side, the sleeve 190 and the 2-speed driving gear 72 mainly relatively rotate with their wedge action so that the spline teeth 190a in the sleeve 190 are meshed with the dog teeth 94b side in the 2-speed driving gear 72, and thus a 2-speed stage (a 2-speed in-gear state) is established.

Figure 3:
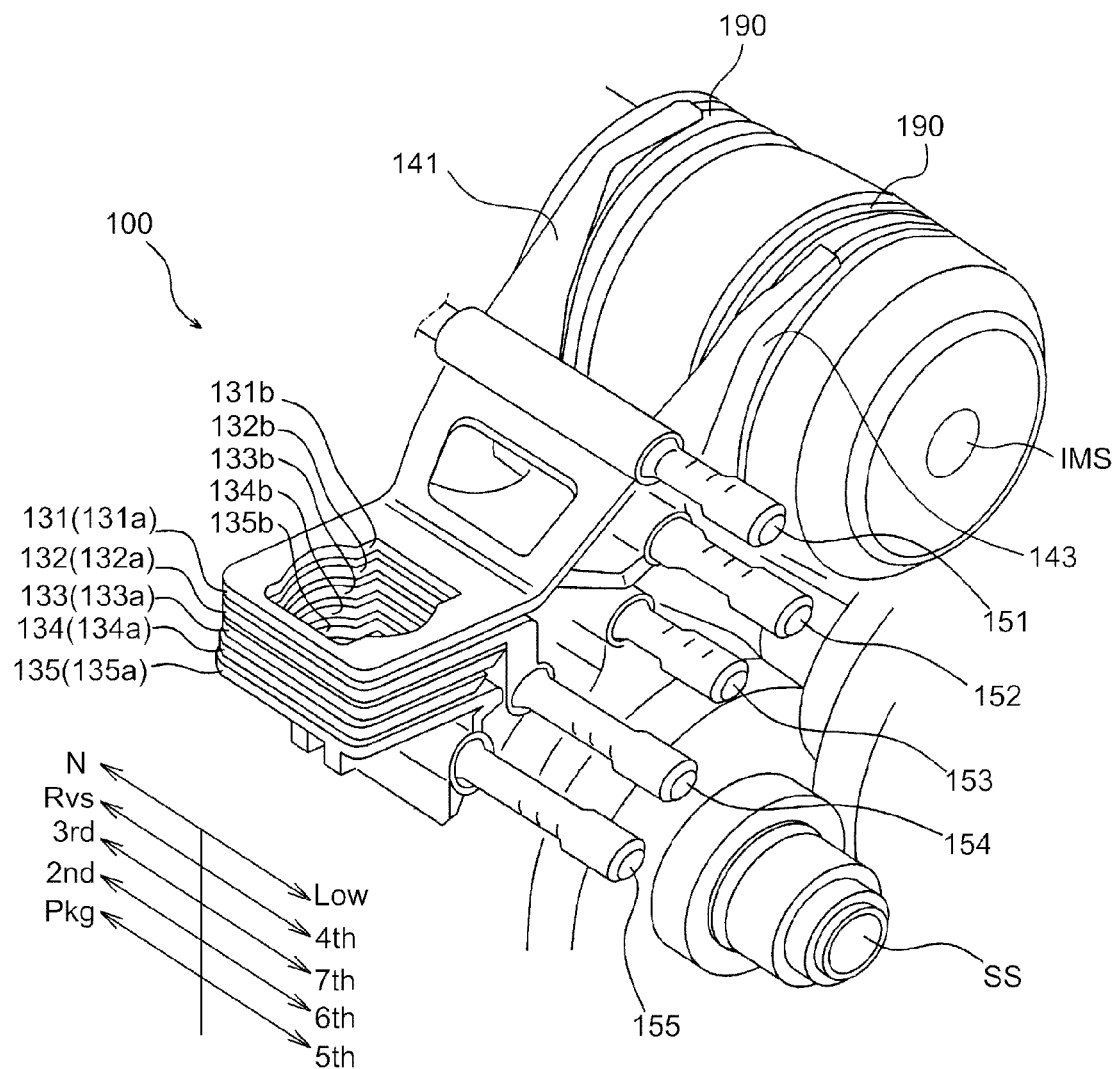
FIG. 3 is a partially enlarged perspective view showing a part of a gear operating mechanism.
Figure 4:
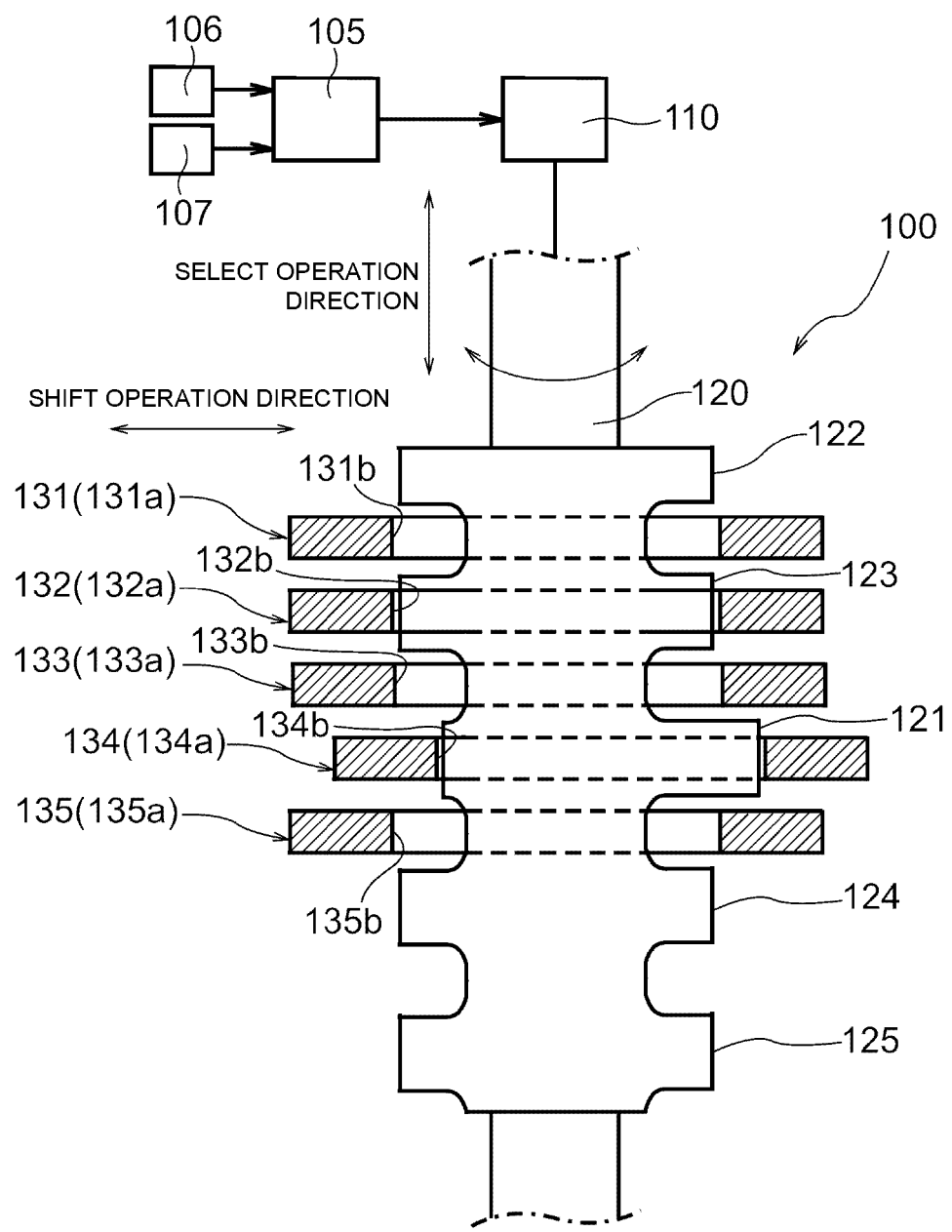
FIG. 4 is a side view showing a part of the gear operating mechanism.

Next, the gear operating mechanism 100 configured to operate the synchronous mechanisms 81, 82, 83, 84, 85, and 89 will be described. FIG. 3 is a partially enlarged perspective view showing a part of the gear operating mechanism 100. FIG. 4 is a side view showing a part of the gear operating mechanism 100. Note that a shift shaft 120 and an actuator part 110 which will be described below are not illustrated in FIG. 3. Furthermore, FIG. 4 is the cross-sectional view of shift members 131 to 135 which will be described below, only parts (only protrusions 131a to 135a) of which are partially cut. Note that assignment of the shift members 131 to 135 and fork parts 141 to 145 with respect to the synchronous mechanisms 81, 82, 83, 84, 85, and 89 is not necessarily limited to the assignment illustrated in FIGS. 3 and 4 in this embodiment.

As shown in FIGS. 3 and 4, the gear operating mechanism 100 includes the shift shaft 120 supported movably in a rotational direction and the axial direction. The shift shaft 120 is subject to an operation (a shift operation) in the rotational direction and an operation (a selecting operation) in the axial direction using the actuator part 110.

A position and a posture of the shift shaft 120 is controlled through the actuator part 110 driven using a command from a control unit 105. Gradient information is transferred from a gradient determination unit 106 such as an acceleration sensor configured to determine a gradient of a road surface with which drive wheels of a hybrid vehicle come into contact with the control unit 105. Furthermore, speed information is transferred from a speed determination unit 107 such as a speed sensor configured to determine a speed of a hybrid vehicle to the control unit 105.

One in-gear engagement piece 121 and a total of four off-gear engagement pieces 122 to 125, i.e., two off-gear engagement pieces above the in-gear engagement piece and two off-gear engagement pieces below the in-gear engagement piece, are provided in the shift shaft 120. Furthermore, the shift members 131 to 135 moved in a horizontal direction in the drawing are disposed at positions at which they are engaged with the in-gear engagement piece 121 and the off-gear engagement pieces 122 to 125.

The claw-shaped fork parts 141 to 145 engaged with the sleeve 190 disposed in the shafts are integrally disposed in the shift members 131 to 135. Furthermore, the shift members 131 to 135 include fork shafts 151 to 155 configured to guide the fork parts 141 to 145 to be able to be moved in the axial direction.

Also, although not shown, a detent mechanism configured to generate a detent load used to hold the shift members 131 to 135 at an in-gear position when the shift members 131 to 135 are moved in a shift direction (in the axial direction of the fork shafts 151 to 155) is provided.

The plurality of shift members 131 to 135 will be described in detail. As shown in FIG. 3, all of the shift members 131 to 135 can be moved in two directions in the axial direction of the fork shafts 151 to 155.

A 1-speed shift member 131 operates sleeves in the 1-speed synchronous mechanism 81 in the inner main shaft IMS. Note that the 1-speed shift member 131 has a 1-speed in-gear state when it is moved to one side, but the 1-speed shift member 131 has an empty slot when it is moved to the other side. For this reason, none of the sleeves in the synchronous mechanism is operated even when the 1-speed shift member 131 is moved to the other side.

A 4-speed-R shift member 132 operates sleeves in the 4-speed synchronous mechanism 84 in the secondary shaft SS and sleeves in the reverse synchronous mechanism 89 in the reverse shaft RVS. A 3-7-speed shift member 133 operates sleeves in the 3-7-speed synchronous mechanism 83 in the inner main shaft IMS. A 2-6-speed shift member 134 operates sleeves in the 2-6-speed synchronous mechanism 82 in the secondary shaft SS. A 5-speed-P shift member 135 operates sleeves in the 5-speed synchronous mechanism 85 in the inner main shaft IMS and sleeves (not shown) in a parking gear.

As shown in FIG. 3, in this embodiment, the 1-speed synchronous mechanism 81 is in an in-gear state (an engaged state) to be a 1-speed gear (a Low gear) through the fork part 141 when the 1-speed shift member 131 is moved to one side, but none of the gears is engaged with the fork part 141 when the 1-speed shift member 131 is moved to the other side.

Similarly, the 4-speed synchronous mechanism 84 is in an in-gear state to be a 4-speed gear through the fork part 142 (not shown) when the 4-speed-R shift member 132 is moved to one side, and the reverse synchronous mechanism 89 is in an in-gear state to be a reverse gear with the fork part 142 (not shown) when the 4-speed-R shift member 132 is moved to the other side. The 3-7-speed synchronous mechanism 83 is in an in-gear state to be a 3-speed gear through the fork part 143 when the 3-7-speed shift member 133 is moved to one side, and the 3-7-speed synchronous mechanism 83 is in an in-gear state to be a 7-speed gear with the fork part 143 when the 3-7-speed shift member 133 is moved to the other side.

The 2-6-speed synchronous mechanism 82 is an in-gear state to be a 2-speed gear with the fork part 144 (not shown) when the 2-6-speed shift member 134 is moved to one side, and the 2-6-speed synchronous mechanism 82 is in an in-gear state to be a 6-speed gear through the fork part 144 (not shown) when the 2-6-speed shift member 134 is moved to the other side. The 5-speed synchronous mechanism 85 is in an in-gear state to be a 5-speed gear through the fork part 145 (not shown) when the 5-speed-P shift member 135 is moved to one side, and is in an in-gear state to be a parking gear through the fork part 145 (not shown) when the 5-speed-P shift member 135 is moved to the other side.

Notch holes 131b to 135b (notch grooves) through which the shift shaft 120 is inserted are formed in the shift members 131 to 135. Furthermore, outer circumferences of the shift members 131 to 135 are the substantially rectangular flat plate-shaped protrusions 131a to 135a. The protrusions 131a to 135a and the notch holes 131b to 135b are disposed to overlap in the axial direction of the shift shaft 120.

The plurality of off-gear engagement pieces 122 to 125 provided in the shift shaft 120 are provided to be shifted from the in-gear engagement piece 121 in the axial direction. The off-gear engagement pieces 122 to 125 are formed to have smaller dimensions in a protrusion dimension than the in-gear engagement piece 121 and are formed to have the same shape.

As shown in FIG. 4, in the gear operating mechanism 100, the actuator part 110 is configured to turn (shift) the shift shaft 120 in the rotational direction and move (select) the shift shaft 120 in the axial direction. Moreover, the shift members 131 to 135 are moved when the in-gear engagement piece 121 comes into contact with and presses all inner circumferences of the notch holes 131b to 135b. Thus, a corresponding synchronous sleeve 190 is moved through the shift members 131 to 135 in the axial direction, and thus the corresponding gear and shaft are coupled to each other.

The in-gear engagement piece 121 and the off-gear engagement pieces 122 to 125 are provided at every other corresponding positions of the shift members 131 to 135 in the axial direction of the shift shaft 120. Thus, when the in-gear engagement piece 121 is at a corresponding position of any of the shift members 131, 133, and 135 in the synchronous mechanism 81, 83, or 85 (a synchronous mechanism of an odd shift stage) in the first shift mechanism GR1, all of the off-gear engagement pieces 122 to 125 are disposed at corresponding positions of the shift members 131, 133, and 135 in the other synchronous mechanisms 81, 83, or 85 in the first shift mechanism GR1.

Similarly, when the in-gear engagement piece 121 is at a corresponding position of any of the shift members 132 and 134 in the synchronous mechanisms 82 or 84 (a synchronous mechanism for even shift stages) in the second shift mechanism GR2, all of the off-gear engagement pieces 122 to 125 are disposed at corresponding positions of the shift members 132 and 134 in the other synchronous mechanism 82 or 84 in the second shift mechanism GR2. Note that FIG. 4 illustrates a case in which the in-gear engagement piece 121 is disposed at a corresponding position of the 2-6-speed shift member 134. In this case, an off-gear engagement piece 123 is disposed at a position corresponding to the 4-speed-R shift member 132.

With such a configuration, when the shift shaft 120 is rotated in a state in which the in-gear engagement piece 121 is located inside any of the notch holes 131b to 135b in the shift members 131 to 135 which is at an off-gear position (a reference position) serving as a neutral state, the in-gear engagement piece 121 comes into contact with any of the inner circumferences of the notch holes 131b to 135b. Moreover, the in-gear engagement piece 121 presses any of the inner circumferences of the notch holes 131b to 135b so that the shift members 131 to 135 are moved to in-gear positions.

On the other hand, when the shift shaft 120 is rotated in a state in which any of the off-gear engagement pieces 122 to 125 is located inside any of the notch holes 131b to 135b in the shift members 131 to 135 which is at an in-gear position, the off-gear engagement pieces 122 to 125 come into contact with and press the inner circumferences of the notch holes 131b to 135b. Thus, the shift members 131 to 135 are moved to reference positions.

An operation of the shift members 131 to 135 using the in-gear engagement piece 121 and the off-gear engagement pieces 122 to 125 will be described with reference to FIGS. 5A to 5D. FIGS. 5A to 5D are diagrams for describing an engagement operation and a release operation (a first release mode) of the shift members 131 to 135 in the gear operating mechanism 100. In FIGS. 5A to 5D, positions of the protrusion 135a in the 5-speed-P shift member 135 on which an engagement operation (an in-gear operation) is performed and the protrusion 133a in the 3-7-speed shift member 133 on which an engagement release operation (an off-gear operation) is performed among the shift members 131 to 135 to be operated are illustrated. In the state shown in FIG. 5A, the 5-speed-P shift member 135 is at a reference position, and the 3-7-speed shift member 133 is at a 7-speed in-gear position.

Figure 5A:
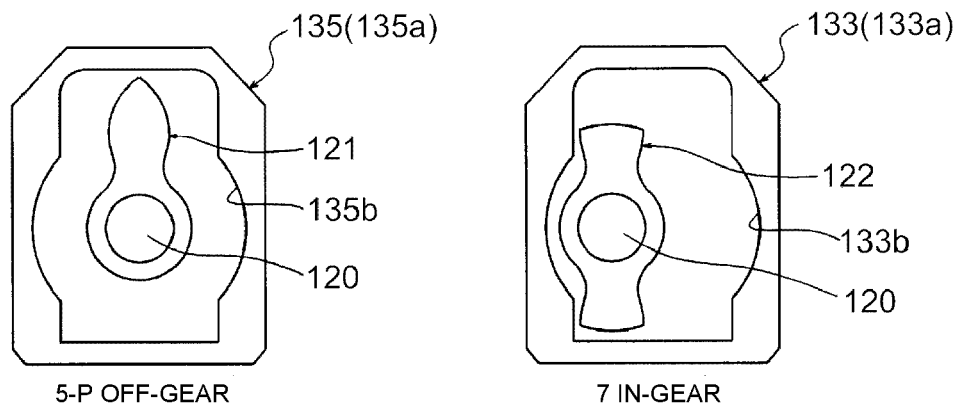
FIGS. 5A to 5D are diagrams for describing an engagement operation and a release operation (a first release mode) of a shift member in the gear operating mechanism.
Figure 5B:
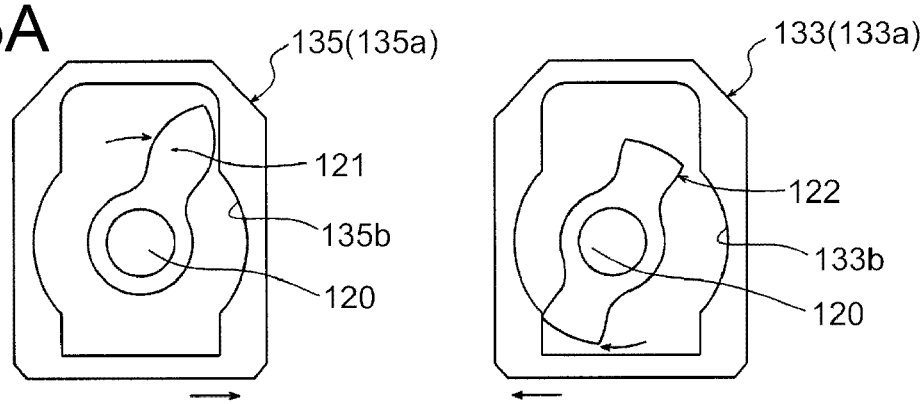

As shown in FIG. 5B, when the shift shaft 120 turns clockwise, the in-gear engagement piece 121 also turns in a similar manner. Thus, the in-gear engagement piece 121 comes into contact with an inner circumference of the notch hole 135b in the 5-speed-P shift member 135. On the other hand, when the shift shaft 120 turns clockwise, the off-gear engagement piece 122 also turns in a similar manner. Thus, the off-gear engagement piece 122 comes into contact with an inner circumference of the notch hole 133b in the 3-7-speed shift member 133 which is at an in-gear position and is pressed to the left in the drawing.

Figure 5C:
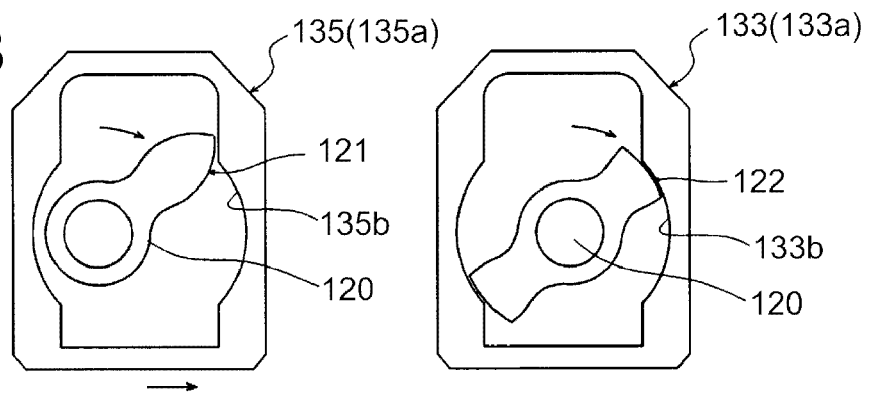

As shown in FIG. 5C, when the shift shaft 120 further turns, the in-gear engagement piece 121 and the off-gear engagement piece 122 which are fixed to be coaxial with each other turn in a similar manner. Thus, the 5-speed-P shift member 135 is pressed to the right in the drawing, and the 3-7-speed shift member 133 stays at the reference position.

Figure 5D:
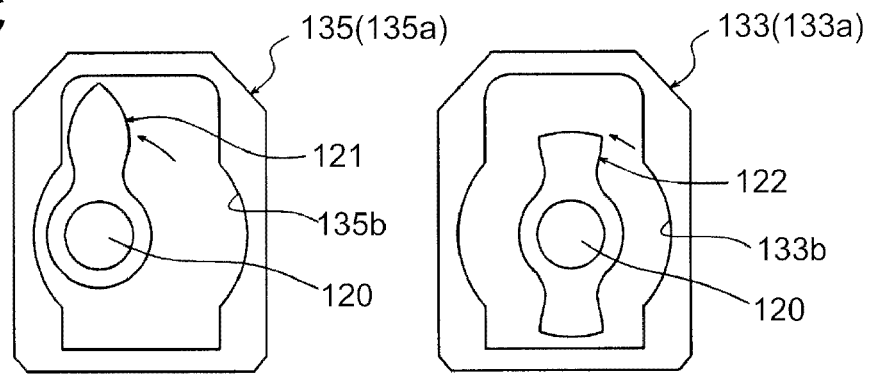

As shown in FIG. 5D, when the 5-speed-P shift member 135 is at a 5-speed in-gear position and the 3-7-speed shift member 133 is at the reference position, gear shifting is completed. Thus, the control unit 105 returns an angle of the shift shaft 120 to the original angle.

One shift member at the reference position is pressed by the in-gear engagement piece 121 using the gear operating mechanism 100 as described above and is moved to an in-gear position. At the same time, another shift member at an in-gear position can be returned to the reference position using any of the off-gear engagement pieces 122 to 125.

In the release operation in FIG. 5, the 3-7-speed shift member 133 is returned to the reference position using the off-gear engagement piece 122. A mode in which an off-gear (an engagement release) operation is performed using the off-gear engagement pieces 122 to 125 so that any of the shift members 131 to 135 is returned to the reference position as described above is referred to as a first release mode. On the other hand, a mode in which an off-gear operation is performed using the in-gear engagement piece 121 so that any of the shift members 131 to 135 is returned to the reference position is referred to as a second release mode. The control unit 105 can select the first release mode and the second release mode which will be described below.

The second release mode will be described with reference to FIGS. 6A to 6C. FIGS. 6A to 6C are diagrams for describing a release operation (the second release mode) of the shift member in the gear operating mechanism 100. In FIGS. 6A to 6C, the 1-speed shift member 131 on which an engagement release operation is performed is illustrated among the shift members 131 to 135 to be operated. In the state illustrated in FIG. 6A, the 1-speed shift member 131 is at a 1-speed in-gear position.

As shown in FIG. 6B, when the shift shaft 120 turns clockwise, the in-gear engagement piece 121 also turns in a similar manner. Thus, the in-gear engagement piece 121 comes into contact with an inner circumference of the notch hole 131b in the 1-speed shift member 131 and is pressed to the right in the drawing. As shown in FIG. 6C, when the 1-speed shift member 131 is at the reference position, the control unit 105 returns an angle of the shift shaft 120 to the original angle.

As described above, generally, the in-gear engagement piece 121 used for an in-gear operation is used for an off-gear operation in the second release mode. The in-gear engagement piece 121 is formed to be longer than the off-gear engagement pieces 122 to 125. For this reason, an operation quantity (a moving distance) of the 1-speed shift member 131 is greater.

As described above, the 1-speed shift member 131 in this embodiment has a 1-speed in-gear state when it is moved to one side, but the 1-speed shift member 131 therein has an empty slot when it is moved to the other side. For this reason, the 1-speed shift member 131 can be moved toward the empty slot. In this case, another gear in the transmission is not in an in-gear state even when the 1-speed shift member 131 is moved toward the empty slot. Thus, when a 1-speed off-gear operation is performed using the in-gear engagement piece 121 at the time of shifting, the 1-speed shift member 131 can be significantly moved toward the empty slot. Thus, an off-gear operation can be reliably performed, for example, even when a great load is applied to the 1-speed shift member 131.

Differences between operations of the shift shaft 120 in the first release mode and the second release mode will be described with reference to FIGS. 7A to 8C. First, an operation of the shift shaft 120 in the first release mode will be described. FIGS. 7A to 7C are diagram for describing the operation of the shift shaft 120 in the first release mode.

FIGS. 7A to 7C illustrate a procedure in which a 5-speed gear is released using the first release mode in a process in which a state transitions from a 5-speed in-gear to a 3-speed in-gear.

As shown in FIG. 7A, in the state of a 5-speed in-gear, the 5-speed-P shift member 135 is shifted toward a 5-speed. On the other hand, the other shift members are at the reference position.

When the control unit 105 uses the first release mode in this state, the control unit 105 moves up the shift shaft 120 until the in-gear engagement piece 121 is adjacent to the 3-7-speed shift member 133 (refer to FIG. 7B). As shown in FIG. 7B, the 5-speed-P shift member 135 is still at a 5-speed in-gear position even when the in-gear engagement piece 121 has been adjacent to the 3-7-speed shift member 133.

As shown in FIG. 7C, when a state is set to a 3-speed in-gear and a 5-speed off-gear, the control unit 105 turns the shift shaft 120. Thus, as illustrated with reference to FIGS. 5A to 5D, the in-gear engagement piece 121 presses the notch hole 133b in the 3-7-speed shift member 133 to shift it toward a 3-speed. At the same time, an off-gear engagement piece 124 presses the notch hole 135b in the 5-speed-P shift member 135 to return the 5-speed-P shift member 135 to the reference position.

As described above, in the first release mode, when the shift shaft 120 is turned, a shift stage in a shift destination is in an in-gear state, and a shift stage in a shift source is in an off-gear state at the same time. Thus, shifting can be performed in a short time, and gear shifting is rapidly performed.

FIGS. 8A to 8C are diagrams for describing an operation of the shift shaft 120 in the second release mode. FIGS. 8A to 8C illustrate a procedure in which a 1-speed gear is released using the second release mode in a process in which a state transitions from a 1-speed in-gear to a 3-speed in-gear.

As shown in FIG. 8A, in the state of a 1-speed in-gear, the 1-speed shift member 131 is shifted toward a 1-speed. On the other hand, the other shift members are at the reference position.

When the control unit 105 uses the second release mode in this state, the in-gear engagement piece 121 is used for a 1-speed off-gear once. In other words, the control unit 105 turns the shift shaft 120 by a predetermined phase (refer to FIG. 6A to 6C) while a position of the shift shaft 120 is maintained such that the in-gear engagement piece 121 is adjacent to the 1-speed shift member 131. Thus, as shown in FIG. 8B, the in-gear engagement piece 121 presses the notch hole 131b in the 1-speed shift member 131 so that the 1-speed shift member 131 is shifted toward a 1-speed off-gear. Thus, a 1-speed off-gear operation is completed.

After that, in order to set a 3-speed in-gear, the control unit 105 moves the shift shaft 120 (refer to FIG. 8C) such that the in-gear engagement piece 121 is adjacent to the 3-7-speed shift member 133. Moreover, the shift shaft 120 is turned so that the in-gear engagement piece 121 presses the notch hole 133b in the 3-7-speed shift member 133 and the 3-7-speed shift member 133 is shifted toward a 3-speed.

As described above, in the second release mode, when a state is returned from an engagement position to the reference position, the in-gear engagement piece 121 is used. Since the in-gear engagement piece 121 is formed to have a longer length than the off-gear engagement pieces 122 to 125, the shift member can be moved more significantly. Thus, an off-gear operation can be firmly performed.

Figure 9:
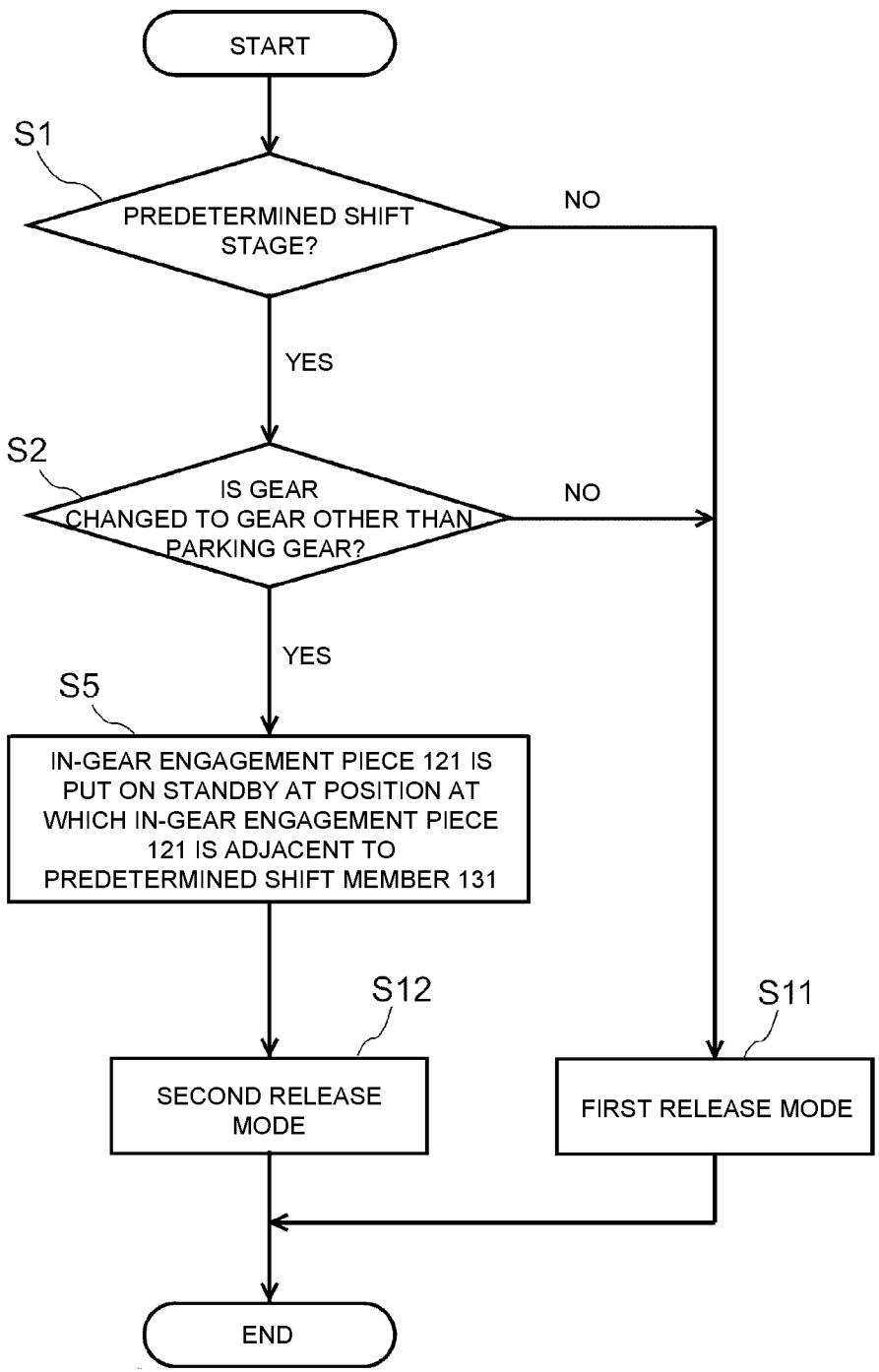
FIG. 9 is a flowchart for describing control in an embodiment.

A method of determining whether to use either a first release mode or a second release mode used at the time of shifting will be described with reference to FIG. 9. FIG. 9 is a flowchart for describing control in this embodiment. Furthermore, in this embodiment, description thereof will be provided using a case in which a state is shifted from a 1-speed in-gear to another odd stage or a case in which a state transitions to a parking state as an example.

In this embodiment, in the case of one-speed in-gear, since it is determined that transmission power (transmission torque) between the inner main shaft IMS and the 1-speed synchronous mechanism 81 is a predetermined value or more, a 1-speed gear is set as a predetermined shift stage, and the 1-speed shift member 131 corresponding to the 1-speed gear is set as a predetermined member to be operated.

First, the control unit 105 determines whether a shift stage which is in an in-gear state is a predetermined shift stage (Step S1) when receiving a command used for shifting of a gear.

In this embodiment, since the predetermined shift stage is set to a 1-speed gear in Step S1, when the shift stage which is in the in-gear state is a gear other than the 1-speed gear, the shift members 132, 133, 134, and 135 are in off-gear states in the first release mode (Step S11), and shifting is performed. On the other hand, when the shift stage which is in the in-gear state is a gear of a predetermined shift stage (a 1-speed gear in this embodiment) in Step S1, it is determined whether gear shifting is the 1-speed gear to the parking gear (Step S2).

In Step S2, when the gear shifting is shifting to any of odd stages (3-speed, 5-speed, and 7-speed) other than a 1-speed rather than the gear shifting to the parking gear, the 1-speed shift member 131 is shifted to be an off-gear state in the second release mode using the in-gear engagement piece 121 (Step S12). On the other hand, when a command concerning gear shifting to the parking gear is given such as when a parking command is given in Step S2, the 1-speed shift member 131 is in an off-gear state so that shifting is performed in the first release mode using the off-gear engagement piece 122 (Step S11).

Here, in Step S2, when the control unit 105 determines that the second release mode of Step S12 is used, the shift shaft 120 is moved in advance in a process in which a process transitions from Step S2 to Step S12, and the in-gear engagement piece 121 is put on standby such that the in-gear engagement piece 121 is adjacent to the 1-speed shift member 131 (Step S5). After that, the off-gear operation in Step S12 is performed using a release signal of the control unit 105. The in-gear engagement piece 121 is put on standby in advance at a position at which it is adjacent to the 1-speed shift member 131 as described above so that an engagement release of the 1-speed gear can be rapidly performed, and thus a response time at the time of shifting is shortened.

On the other hand, when the in-gear engagement piece 121 which is in an in-gear state and in front of another shift member such as a shift member corresponding to a shift stage in a shift destination is put on standby, the shift shaft 120 needs to be moved to a position adjacent to the 1-speed shift member 131 once for the purpose of an engagement release using the second release mode. Thus, a response time at the time of shifting is lengthened.

Figure 10:
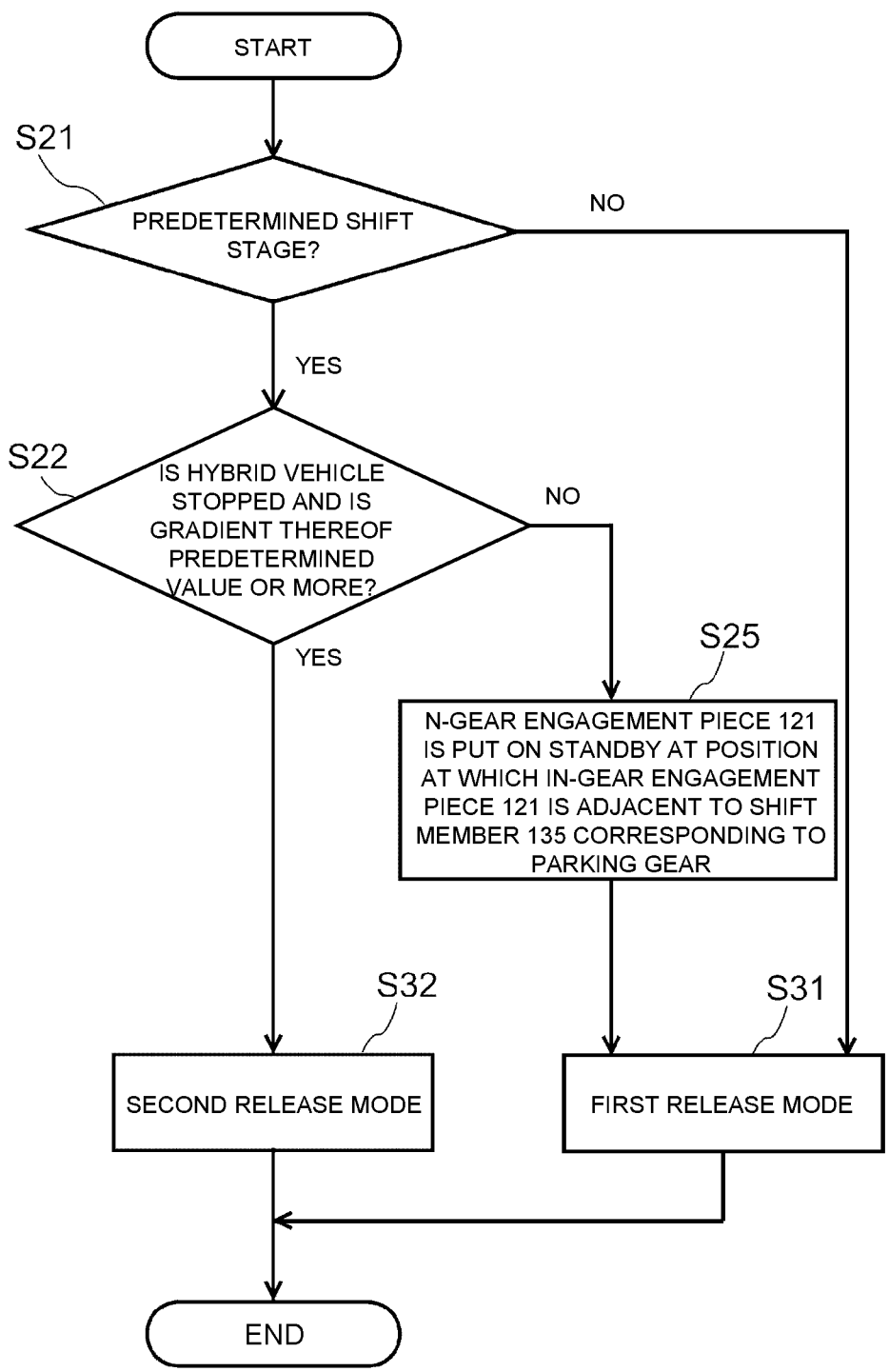
FIG. 10 is a flowchart for describing control in a modified example of the embodiment.

A method of determining whether to use either the first release mode or the second release mode used at the time of shifting is not limited thereto, and the present invention may be determined as follows. FIG. 10 is a flowchart for describing control in a modified example of this embodiment. Description thereof will be provided using a case in which a predetermined shift stage is set as a 1-speed gear and a state is shifted from a 1-speed in-gear to another odd stage or a case in which a state transitions to a parking state as an example in the modified example as well.

First, the control unit 105 determines whether a shift stage which is in an in-gear state is a predetermined shift stage (Step S21) when receiving a command used for shifting of a gear.

When a shift stage which is in an in-gear state is a stage other than a 1-speed gear in Step S21, the shift members 132, 133, 134, and 135 are in off-gear states in the first release mode (Step S31), and shifting is performed. On the other hand, when the shift stage which is in the in-gear state is a predetermined shift stage in Step S21, the control unit 105 acquires gradient information from the gradient determination unit 106. Moreover, it is determined whether the hybrid vehicle is stopped and a gradient thereof is a predetermined value or more (Step S22). Note that it is determined using speed information from the speed determination unit 107 whether the hybrid vehicle is stopped.

In Step S22, it is conceivable that the hybrid vehicle is stopped at a place with a gradient when the hybrid vehicle is stopped and the gradient is the predetermined value or more. Transmission power in a 1-speed gear is small in many cases when the hybrid vehicle is stopped, and it is desirable that responsiveness to the parking gear is high when the gradient is the predetermined value or more. For this reason, in this case, the 1-speed shift member 131 is in an off-gear state in the first release mode using the off-gear engagement piece 122, and shifting is performed (Step S31).

When the control unit 105 determines that the first release mode in Step S31 is used in Step S22, the shift shaft 120 is moved in advance in a process in which a process transitions from Step S22 to Step S31, and the in-gear engagement piece 121 is put on standby such that the in-gear engagement piece 121 is adjacent to the 5-speed-P shift member 135 corresponding to the parking gear (Step S25). Subsequently, an off-gear operation using the first release mode is performed by the off-gear engagement piece 122 using a release signal of the control unit 105 (Step S31).

Here, the in-gear engagement piece 121 and the off-gear engagement piece 122 use the shift shaft 120 as the same shaft. For this reason, the in-gear engagement piece 121 which is put on standby at a position adjacent to the 5-speed-P shift member 135 moves the 5-speed-P shift member 135 in a direction in which the parking gear is in an in-gear state together with the off-gear operation using the off-gear engagement piece 122. Thus, the in-gear operation of the 5-speed-P shift member 135 corresponding to the parking gear can be rapidly performed, and responsiveness of the gear is improved.

On the other hand, when the gradient is less than the predetermined value or the speed is the predetermined value or more in Step S22, the 1-speed shift member 131 is in an off-gear state in the second release mode using the in-gear engagement piece 121, and shifting is performed (Step S32). Thus, an off-gear operation can be reliably performed even when the transmission power is a predetermined value or more.

As described above, in the gear operating mechanism 100 in the transmission 50 in this embodiment, the control unit 105 can select the first release mode and the second release mode. Moreover, when the 1-speed shift member 131 is returned from an engagement position to the reference position, the first release mode using the off-gear engagement pieces 122 to 125 as well as the second release mode using the in-gear engagement piece 121 with a large amount of movement configured to be moved between the reference position and the engagement position are used so that members to be operated and a fork part integrally constituted with each of the members to be operated can be more reliably moved. For this reason, the 1-speed gear can be reliably disengaged from the gear in the 1-speed synchronous mechanism 81 moved by the fork part 141, for example, even when transmission power between the 1-speed gear and the 1-speed synchronous mechanism 81 which are fastened is large. Thus, a gear operation can be more reliably performed.

Also, the control unit 105 may use the first release mode when transmission power between the inner main shaft IMS and the 1-speed synchronous mechanism 81 is less than a predetermined value and use the second release mode when transmission power between the inner main shaft IMS and the 1-speed synchronous mechanism 81 is the predetermined value or more. As described above, the 1-speed shift member 131 is reliably moved using the in-gear engagement piece 121 when a magnitude of the transmission power is a predetermined value or more so that a release operation can be reliably performed even when the magnitude of the transmission power is the predetermined or more.

Also, the in-gear engagement piece 121 may be formed to be longer than the off-gear engagement pieces 122 to 125. The in-gear engagement piece 121 is formed to be longer than the off-gear engagement pieces 122 to 125 as described above so that an operation quantity of a 1-speed shift member 131 using the in-gear engagement piece 121 increases.

If none of the synchronous mechanisms is configured to be moved when the 1-speed shift member 131 is moved to the other side, none of gears is in an in-gear state even when the 1-speed shift member 131 is further moved to the other side after the 1-speed shift member 131 is returned from an engagement position to the reference position when engagement of the 1-speed shift member 131 which is moved to one side and is at the engagement position is released. Thus, the 1-speed shift member 131 can be significantly moved to the other side when an off-gear operation is performed at the time of shifting. Therefore, an off-gear operation can be reliably performed, for example, even when a large load is applied to the 1-speed shift member 131.

The plurality of shift members 131 to 135 may be provided, the second release mode may be used for a predetermined shift member (the 1-speed shift member 131), and the first release mode may be used for a shift member (the 4-speed-R shift member 132, the 3-7-speed shift member 133, the 2-6-speed shift member 134, or the 5-speed-P shift member 135) other than the predetermined shift member. In other words, if it is known in advance that large transmission power is applied to a predetermined shift member among the plurality of shift members, control is simply set if it has been determined that the second release mode is used when an engagement release is performed on the predetermined member to be operated.

Here, when the second release mode is used, an engagement release operation may be performed after the in-gear engagement piece 121 is put on standby at a position at which it is adjacent to the 1-speed shift member 131 in advance. The in-gear engagement piece 121 is put on standby at the position at which it is adjacent to the 1-speed shift member 131 in advance before disengagement so that an off-gear operation of the 1-speed shift member 131 can be rapidly performed, a response time at the time of shifting is shortened, and thus responsiveness is also improved.

The control unit 105 may be characterized by using the first release mode when receiving a parking command. An engagement release is performed using the first release mode using the off-gear engagement piece 122 when the parking command is given so that an off-gear operation using the off-gear engagement piece 122 and an in-gear operation of the 5-speed-P shift member 135 to a parking side using the in-gear engagement piece 121 can be performed at the same time. Thus, responsiveness of a gear operation is improved.

When the gradient determination unit 106 configured to determine a gradient is further provided, and it is determined by the gradient determination unit 106 that the gradient is a predetermined value or more when the hybrid vehicle is stopped, it may be characterized in that the in-gear engagement piece 121 is put on standby at a position at which it is adjacent to the 5-speed-P shift member 135 corresponding to the parking gear. If a gradient is a predetermined value or more when the hybrid vehicle is stopped as described above, the in-gear engagement piece 121 is put on standby at the position at which it is adjacent to the 5-speed-P shift member 135 corresponding to the parking gear in advance so that an in-gear operation of the 5-speed-P shift member 135 corresponding to the parking gear can be rapidly performed and thus responsiveness of a gear is improved.

Although the embodiment of the present invention has been described above, the present invention is not limited to the above-described embodiment, and various modifications can performed without departing from the technical idea disclosed in the claims, the specification, and the drawings.

What is claimed is:

1. A gear operating mechanism in a transmission which operates fork parts configured to operate synchronous mechanisms attached to rotating shafts included in the transmission mounted in a hybrid vehicle, the gear operating mechanism in the transmission, comprising;
    a power source;
    an operation shaft driven by the power source and movably supported in a rotational direction and an axial direction;
    at least one member to be operated corresponding to the fork parts;
    an operation engagement piece attached to the operation shaft and configured to move the at least one member to be operated between the reference position and an engagement position;
    a release engagement piece attached to the operation shaft and configured to return the at least one member to be operated from the engagement position to the reference position; and
    a control unit configured to control an operation of the operation shaft,
    wherein the control unit has:
    a first release mode using the release engagement piece and a second release mode using the operation engagement piece when the at least one member to be operated is returned from the engagement position to the reference position.

2. The gear operating mechanism in the transmission according to claim 1, wherein the control unit uses the first release mode when transmission power between each of the rotating shafts and each of the synchronous mechanisms is less than a predetermined value and uses the second release mode when the transmission power between each of the rotating shafts and each of the synchronous mechanism is the predetermined value or more.

3. The gear operating mechanism in the transmission according to claim 1, wherein the operation engagement piece is formed to have a longer length than the release engagement piece.

4. The gear operating mechanism in the transmission according to claim 1, wherein the at least one member to be operated is able to be moved in two directions, and
the at least one member to be operated is configured such that a corresponding one of the synchronous mechanisms is moved when the at least one member to be operated is moved to one side and none of the other synchronous mechanisms is moved when the at least one member to be operated is moved to the other side.

5. The gear operating mechanism in the transmission according to claim 2, wherein the at least one member to be operated is able to be moved in two directions, and
the at least one member to be operated is configured such that a corresponding one of the synchronous mechanisms is moved when the at least one member to be operated is moved to one side and none of the other synchronous mechanisms is moved when the at least one member to be operated is moved to the other side.

6. The gear operating mechanism in the transmission according to claim 3, wherein the at least one member to be operated is able to be moved in two directions, and
the at least one member to be operated is configured such that a corresponding one of the synchronous mechanisms is moved when the at least one member to be operated is moved to one side and none of the other synchronous mechanisms is moved when the at least one member to be operated is moved to the other side.

7. The gear operating mechanism in the transmission according to claim 1, wherein the at least one member to be operated is a plurality of members to be operated, and
the control unit uses the second release mode for a predetermined one of the plurality of members to be operated and uses the first release mode for another one of the plurality of members to be operated other than the predetermined one of the plurality of members to be operated.

8. The gear operating mechanism in the transmission according to claim 2, wherein the at least one member to be operated is a plurality of members to be operated, and
the control unit uses the second release mode for a predetermined one of the plurality of members to be operated and uses the first release mode for another one of the plurality of members to be operated other than the predetermined one of the plurality of members to be operated.

9. The gear operating mechanism in the transmission according to claim 3, wherein the at least one member to be operated is a plurality of members to be operated, and
the control unit uses the second release mode for a predetermined one of the plurality of members to be operated and uses the first release mode for another one of the plurality of members to be operated other than the predetermined one of the plurality of members to be operated.

10. The gear operating mechanism in the transmission according to claim 4, wherein the at least one member to be operated is a plurality of members to be operated, and
the control unit uses the second release mode for a predetermined one of the plurality of members to be operated and uses the first release mode for another one of the plurality of members to be operated other than the predetermined one of the plurality of members to be operated.

11. The gear operating mechanism in the transmission according to claim 7, wherein the control unit performs an engagement release operation after the operation engagement piece is put on standby at a position at which the operation engagement piece is adjacent to the predetermined one of the plurality of members to be operated when the second release mode is used.

12. The gear operating mechanism in the transmission according to claim 8, wherein the control unit performs an engagement release operation after the operation engagement piece is put on standby at a position at which the operation engagement piece is adjacent to the predetermined one of the plurality of members to be operated when the second release mode is used.

13. The gear operating mechanism in the transmission according to claim 9, wherein the control unit performs an engagement release operation after the operation engagement piece is put on standby at a position at which the operation engagement piece is adjacent to the predetermined one of the plurality of members to be operated when the second release mode is used.

14. The gear operating mechanism in the transmission according to claim 10, wherein the control unit performs an engagement release operation after the operation engagement piece is put on standby at a position at which the operation engagement piece is adjacent to the predetermined one of the plurality of members to be operated when the second release mode is used.

15. The gear operating mechanism in the transmission according to claim 7, wherein the control unit uses the first release mode when receiving a parking command.

16. The gear operating mechanism in the transmission according to claim 11, wherein the control unit uses the first release mode when receiving a parking command.

17. The gear operating mechanism in the transmission according to claim 15, further comprising:
a gradient determination unit configured to determine a gradient,
wherein the control unit puts the operation engagement piece on standby at the position at which the operation engagement piece is adjacent to a corresponding one of the plurality of members to be operated of a parking gear if it is determined by the gradient determination unit that the gradient is the predetermined value or more when the hybrid vehicle is stopped.

18. The gear operating mechanism in the transmission according to claim 16, further comprising:
a gradient determination unit configured to determine a gradient,
wherein the control unit puts the operation engagement piece on standby at the position at which the operation engagement piece is adjacent to a corresponding one of the plurality of members to be operated of a parking gear if it is determined by the gradient determination unit that the gradient is the predetermined value or more when the hybrid vehicle is stopped.

* * * * *